United States Patent
Nakajo et al.

(10) Patent No.: US 9,131,564 B2
(45) Date of Patent: Sep. 8, 2015

(54) LIGHTING DEVICE AND ILLUMINATION APPARATUS USING SAME

(75) Inventors: Akira Nakajo, Kyoto (JP); Hiroshi Kido, Osaka (JP); Shigeru Ido, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 110 days.

(21) Appl. No.: 13/557,387

(22) Filed: Jul. 25, 2012

(65) Prior Publication Data

US 2013/0026937 A1    Jan. 31, 2013

(30) Foreign Application Priority Data

Jul. 29, 2011    (JP) .................................. 2011-166945
Jul. 29, 2011    (JP) .................................. 2011-166946
Sep. 22, 2011    (JP) .................................. 2011-207500

(51) Int. Cl.
*H05B 33/08*    (2006.01)
*H05B 41/04*    (2006.01)

(52) U.S. Cl.
CPC ........... *H05B 33/0815* (2013.01); *Y02B 20/346* (2013.01)

(58) Field of Classification Search
None
See application file for complete search history.

(56) References Cited

U.S. PATENT DOCUMENTS

| | | | |
|---|---|---|---|
| 5,303,140 A * | 4/1994 | Shimizu | ........................ 363/132 |
| 7,466,110 B2 | 12/2008 | Tsuruya | |
| 8,415,889 B2 * | 4/2013 | Hiramatsu et al. | ........ 315/200 R |
| 2005/0152163 A1 | 7/2005 | Heckmann et al. | |
| 2007/0103949 A1 * | 5/2007 | Tsuruya | ........................ 363/125 |
| 2008/0093999 A1 | 4/2008 | Cheng et al. | |
| 2011/0121754 A1 | 5/2011 | Shteynberg et al. | |

FOREIGN PATENT DOCUMENTS

| | | | |
|---|---|---|---|
| CN | 1906839 | 1/2007 | |
| CN | 201114959 | 9/2008 | |
| CN | 101883461 | * 11/2010 | ............. Y02B 20/42 |
| JP | H9-168281 A | 6/1997 | |
| JP | H9-298873 A | 11/1997 | |
| JP | 3263194 | 3/2002 | |
| JP | 3327013 | 9/2002 | |
| JP | 2009-134946 | 6/2009 | |
| KR | 10-0860565 | 9/2008 | |

OTHER PUBLICATIONS

Application note, AN2928, ST Microelectronics, 2009.*

(Continued)

*Primary Examiner* — Douglas W Owens
*Assistant Examiner* — Dedei K Hammond
(74) *Attorney, Agent, or Firm* — Renner, Otto, Boisselle & Sklar, LLP

(57) ABSTRACT

A light emitting element lighting device includes: a rectifying unit which rectifies an AC voltage; a smoothing unit which smoothes a ripple voltage from the rectifying unit; a power supply unit having a switching element; and a control unit which controls on/off of the switching element. Further, the smoothing unit servers as a partial smoothing circuit for partially smoothing a low voltage period of the ripple voltage outputted from the rectifying unit. The power supply unit supplies a lighting power to a light source unit including one or more light emitting elements. The control unit controls a switching frequency of the switching element to decrease as the output voltage of the smoothing unit decreases.

6 Claims, 12 Drawing Sheets

(56) References Cited

OTHER PUBLICATIONS

ST AN2928 Application Note, Modified buck converter for LED applications, Mar. 2009.*

European Search Report for corresponding European Application No. 12177943.3 dated Mar. 28, 2013.

"AN2928 Application Note", ST Microelectronics, Mar. 1, 2009 Retrieved from the Internet: URL:www.datasheetarchive.com/AN2928-datasheet.html.

AN2928 Application note, Mar. 2009, STMicroelectronics.

Chinese Office Action and Search Report for corresponding Chinese Application No. 201210269190.8 dated Mar. 26, 2014 (w/English translation).

Chinese Office Action including the Search Report issued on Dec. 3, 2014 in a corresponding Chinese application No. 201210269190.8 and the English translation thereof.

The Japanese Office Action issued on Feb. 17, 2015 in a corresponding Japanese application No. 2011-166946 and the English summary thereof.

The Japanese Office Action issued on Mar. 3, 2015 in a corresponding Japanese application No. 2011-207500 and the English summary thereof.

\* cited by examiner

LIGHTING DEVICE AND ILLUMINATION APPARATUS USING SAME

FIELD OF THE INVENTION

The present invention relates to a lighting device for turning on light emitting elements such as light emitting diodes, and an illumination apparatus using the same.

BACKGROUND OF THE INVENTION

In recent years, there has been provided an LED illumination apparatus using light emitting diodes as a light source (see, e.g., Japanese Patent Application Publication No. 2009-134946). The LED illumination apparatus has an apparatus body in which an LED light emitting unit including light emitting diodes and a lighting circuit unit supplying the LED light emitting unit with a current for turning on the light emitting diodes are installed. The lighting circuit unit includes a switching power supply circuit section and a filter circuit section.

The switching power supply circuit section is a nonisolated step-down chopper circuit whose switching is controlled by a control circuit also serving as a power switching element (e.g., MIP552 manufactured by Matsushita Electric Industrial Co., Ltd.). In such LED illumination apparatus, if the ambient temperature changes and the temperature increases to a high temperature from a low temperature, the control is performed to increase the light output by increasing the current flowing through the light emitting diodes, thereby making the light output to be substantially constant.

Connected to the input terminal of the switching power supply circuit section of the above conventional example is an input capacitor which smoothes the voltage that is full-wave rectified by a full-wave rectifier. If a capacitance value of the input capacitor is small, a ripple component of the load current flowing through the LED light emitting unit increases. For example, if an image is captured by a video camera or the like, there is a possibility that flickering occurs on the screen when a shutter speed is not synchronized to the frequency of a commercial power source. The ripple component can be reduced by increasing the capacitance value of an output capacitor connected to the output terminal of the switching power supply circuit section, but a very large electrolytic capacitor is required in order to fill the valleys of the load current occurring at zero-crossing of a source voltage.

As measures to improve such a problem, there is a method to increase the capacitance value of the input capacitor by adopting an electrolytic capacitor as the input capacitor. If the voltage smoothed by the input capacitor can be maintained to be equal to or greater than a certain level even at zero-crossing of the source voltage, a constant load current can flow at all times by a constant current circuit that is connected at a subsequent stage of the switching power supply circuit section.

In other words, by increasing the capacitance value of the input capacitor, it is possible to remove the ripple component of the load current without having to increase the capacitance value of the output capacitor. However, in this case, since it becomes a so-called capacitor input type smoothing circuit, there are problems such that a conduction angle of the input current (charging current to the input capacitor) becomes narrow, power factor deteriorates into being equal to or less than 0.6, and harmonic distortion becomes greater.

Here, in order to reduce the ripple component of the output current (load current) of the switching power supply circuit section and realize the improvement of the power factor, it is general to adopt a so-called two-converter method in which a power factor correction circuit (PFC circuit) is provided at a front stage of the constant current circuit. However, in this case, there are problems such that noise increases and circuit configuration becomes complicated by adding the power factor correction circuit that is a high frequency switching circuit.

In this regard, configurations to reduce the ripple component of the load current and improve the power factor by providing, as a smoothing unit, a partial smoothing circuit for partially smoothing low voltage periods of a ripple voltage outputted from the full-wave rectifier instead of the input capacitor have been disclosed in, e.g., Japanese Patent Nos. 3263194 and 3327013. In such configurations, since the output voltage of the partial smoothing circuit is equal to or greater than a certain value even during the low voltage periods, a constant load current can flow at all times by the constant current circuit that is connected at the subsequent stage thereof, thereby removing the ripple component of the load current. Further, compared to the case of the capacitor input type smoothing circuit, it is possible to improve the power factor.

However, in the case where the partial smoothing circuit is adopted as described above, since a steep charging current flows through the capacitor constituting the partial smoothing circuit, there is a problem such that the peak value of the input current of the partial smoothing circuit increases. In this case, it is requested to use parts with a large current withstanding capability and, accordingly, it is required to increase the thickness of the wire or increase the capacity of a switch or breaker, which causes an increase in cost or size of the apparatus.

SUMMARY OF THE INVENTION

In view of the above, the present invention provides a light emitting element lighting device capable of realizing reduction in a ripple component of a load current, improvement of a power factor, and reduction of noise, with a simple circuit configuration, and an illumination apparatus using the same.

The present invention also provides a light emitting element lighting device capable of reducing a peak value of an input current of a smoothing unit including a partial smoothing circuit, and an illumination apparatus using the same.

In accordance with a first aspect of the present invention, there is provided a light emitting element lighting device including: a rectifying unit which rectifies an AC voltage outputted from a power supply; a smoothing unit which smoothes a ripple voltage outputted from the rectifying unit; a power supply unit which has a switching element and converts an output voltage of the smoothing unit into a predetermined DC voltage by switching on/off of the switching element to output the predetermined DC voltage; and a control unit which controls on/off of the switching element, wherein the smoothing unit serves as a partial smoothing circuit for partially smoothing a low voltage period of the ripple voltage outputted from the rectifying unit; the power supply unit supplies a lighting power to a light source unit including one or more light emitting elements; and the control unit controls a switching frequency of the switching element to decrease as the output voltage of the smoothing unit decreases.

In the light emitting element, the control unit may control the switching element to operate in a critical current mode.

Further, the control unit may control on/off of the switching element such that an OFF period of the switching element is constant regardless of the frequency.

Between the rectifying unit and the smoothing unit, an inductance element may be provided on a high voltage side line or a low voltage side line.

Preferably, the power supply unit includes a step-up/step-down chopper circuit.

Alternatively, the power supply unit may include a step-down chopper circuit.

Further, the smoothing unit may have a capacitor which is charged in a period other than the low voltage period of an output voltage of the rectifying unit, and discharged in the low voltage period of the output voltage of the rectifying unit.

The light emitting elements may be organic electroluminescence (EL) elements or light emitting diodes.

In accordance with a second aspect of the present invention, there is provided an illumination apparatus including: any one of the light emitting element lighting devices described above; and an apparatus body accommodating the light emitting element lighting device.

In accordance with a third aspect of the present invention, there is provided a light emitting element lighting device including: a rectifying unit which rectifies an AC voltage outputted from a power supply; a smoothing unit which smoothes a ripple voltage outputted from the rectifying unit; a power supply unit which has a switching element and converts an output voltage of the smoothing unit into a predetermined DC voltage by switching on/off of the switching element to output the predetermined DC voltage; and a control unit which controls on/off of the switching element. Further, the smoothing unit serves as a partial smoothing circuit for partially smoothing a low voltage period of the ripple voltage outputted from the rectifying unit, the power supply unit supplies a lighting power to a light source unit including one or more light emitting elements, and an inductance element is connected to an input terminal of the smoothing unit.

Preferably, the inductance element is provided on a high voltage side line or a low voltage side line between the rectifying unit and the smoothing unit.

Further, the control unit may control a switching frequency of the switching element to decrease as the output voltage of the smoothing unit decreases.

The power supply unit may include a step-up/step-down chopper circuit.

Further, the power supply unit may include a step-down chopper circuit.

The light emitting elements may be organic electroluminescence (EL) elements or light emitting diodes.

In accordance with a fourth aspect of the present invention, there is provided an illumination apparatus including: any one of the light emitting element lighting devices described above; and an apparatus body accommodating the light emitting element lighting device.

In accordance with a fifth aspect of the present invention, there is provided a light emitting element lighting device including: a rectifying unit which rectifies an AC voltage outputted from a power supply; a smoothing unit which smoothes a ripple voltage outputted from the rectifying unit; a power supply unit which has a switching element and converts an output voltage of the smoothing unit into a predetermined DC voltage by switching on/off of the switching element to output the predetermined DC voltage; and a control unit which controls on/off of the switching element. Further, wherein the smoothing unit includes two capacitors which are connected in series when charged and are connected in parallel when discharged and a resistor inserted into a charging path, the smoothing unit serving as a partial smoothing circuit for partially smoothing a low voltage period of the ripple voltage outputted from the rectifying unit. The power supply unit supplies a lighting power to a light source unit including one or more light emitting elements. Furthermore, an input current of the smoothing unit has at least two peak values, and at least one of a resistance value of the resistor and a capacitance value of each of the capacitors is set such that the peak value of the input current occurring when charging the capacitors of the smoothing unit is smaller than at least one of the other peak values of the input current.

Preferably, an input power supplied to the power supply unit is 4 W-10 W and the resistance value $R0$ [Ω] of the resistor and the capacitance value $C0$ [μF] of each of the capacitors are set to meet $C0 \leq 5$ or $R0 \geq 16 \times C0 - 80$.

Further, the resistance value $R0$ of the resistor may be set to be equal to or less than 200Ω.

Furthermore, an inductance element may be provided on a high voltage side line or a low voltage side line between the rectifying unit and the smoothing unit.

The control unit may control a switching frequency of the switching element to decrease as the output voltage of the smoothing unit decreases.

Preferably, the power supply unit includes a step-up/step-down chopper circuit.

Further, the power supply unit may include a step-down chopper circuit.

Preferably, the light emitting elements are organic electroluminescence (EL) elements or light emitting diodes.

In accordance with a sixth aspect of the present invention, there is provided an illumination apparatus including: any one of the light emitting element lighting devices described above; and an apparatus body accommodating the light emitting element lighting device.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS (First Embodiment)

Figure 1A:
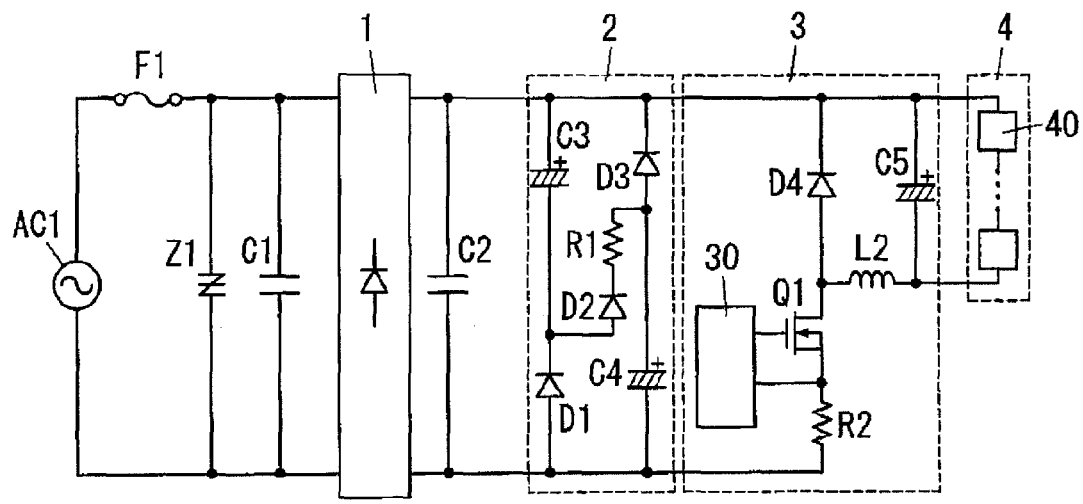
FIGS. 1A and 1B are schematic circuit diagrams showing a light emitting element lighting device in accordance with a first embodiment of the present invention, wherein a normal mode choke coil is not connected and wherein a normal mode choke coil is connected, respectively.

Hereinafter, a light emitting element lighting device in accordance with a first embodiment of the present invention will be described with reference to the accompanying drawings. The emitting element lighting device includes, as shown FIG. 1A, a rectifying unit 1 for rectifying an AC voltage of a commercial power source (external power supply) AC1, a smoothing unit 2 for smoothing an output voltage of the rectifying unit 1, and a power supply unit 3 for supplying a lighting power to a light source unit 4 including a plurality of light emitting elements connected in series. In this embodiment, an organic electroluminescence (EL) element 40 is used as the light emitting element, but another light emitting element such as a light emitting diode 41 (see FIG. 8) may be used. Further, in this embodiment, a source voltage of the commercial power source AC1 is, e.g., 100V.

The rectifying unit 1 is formed of a full-wave rectifier circuit constituted by a diode bridge, and outputs a ripple voltage obtained by rectifying an AC voltage outputted from the commercial power source AC1. In addition, a fuse F1, a surge protection element Z1, and a capacitor C1 for eliminating harmonics are connected between the commercial power source AC1 and the rectifying unit 1. Further, a capacitor C2 is connected in parallel with output terminals of the rectifying unit 1.

The smoothing unit 2 is a partial smoothing circuit for partially smoothing a low voltage period of the ripple voltage outputted from the rectifying unit 1. The smoothing unit 2 includes capacitors C3 and C4 having substantially the same capacitance, a resistor R1 inserted into a charging path, and diodes D1 to D3. The diode D2 and the resistor R1 are connected between a negative electrode of the capacitor C3 and a positive electrode of the capacitor C4 in a direction in which a charging current flows. The diode D1 is connected between the negative electrode of the capacitor C3 and a negative electrode of the capacitor C4 in a direction in which a discharging current of the capacitor C3 flows.

Figure 2A:
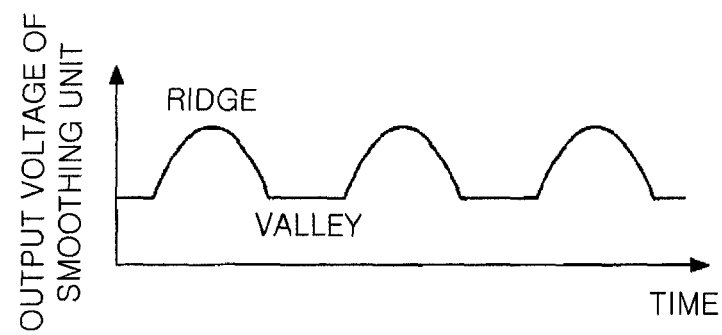
FIGS. 2A and 2B are waveform diagrams showing an output voltage of a smoothing unit and an output current of a step-down chopper circuit in the light emitting element lighting device, respectively.

Further, the diode D3 is connected between a positive electrode of the capacitor C3 and the positive electrode of the capacitor C4 in a direction in which a discharging current of the capacitor C4 flows. The capacitors C3 and C4 are connected in series at the time of charging, and connected in parallel at the time of discharging. Only the low voltage periods of the ripple voltage outputted from the rectifying unit 1 are partially smoothed by the smoothing unit 2 (see FIG. 2A). Hereinafter, the low voltage period is referred to as a "valley" and the other period is referred to as a "ridge".

The power supply unit 3 serves as a step-down chopper circuit which outputs a predetermined DC voltage obtained by stepping down the output voltage of the smoothing unit 2. The power supply unit 3 includes an inductor L2, a diode D4, a capacitor C5, a switching element Q1 consisting of a field-effect transistor (FET), and a control circuit (control unit) 30. In this embodiment, the switching element Q1 is installed on the ground line side, thereby achieving stable switching control.

The control circuit 30 is a drive integrated circuit (IC) for controlling on/off of the switching element Q1, and, e.g., HV9910 (manufactured by Supertex) is used in this embodiment. The HV9910 has a constant off-time mode in which an off period of the switching element Q1 is controlled to be a certain period of time. A detection resistor R2 is connected in series with the switching element Q1 to detect a drain current of the switching element Q1. In this embodiment, the switching element Q1 and the control circuit 30 are provided separately, but the control circuit 30 may be provided as a drive IC including the switching element Q1 therein.

Next, an operation of the power supply unit 3 of this embodiment will be described. In this embodiment, the input power being supplied to the power supply unit 3 is 4 to 10 W, and switching frequency of the switching element Q1 is several tens to several hundreds of kHz. First, if the switching element Q1 is switched on by the control circuit 30, the current flows in a path of the light source unit 4→the inductor L2→the switching element Q1→the detection resistor R2→the ground.

At this time, a rising rate of the current (the drain current of the switching element Q1) flowing through the inductor L2 changes on the basis of the magnitude of the input voltage of the power supply unit 3 (the output voltage of the smoothing unit 2). That is, if the output voltage of the smoothing unit 2 is low (e.g., valleys), the rising rate of the current flowing through the inductor L2 is slower, and if the output voltage of the smoothing unit 2 is high (e.g., ridges), the rising rate of the current flowing through the inductor L2 is faster.

As the current flowing through the inductor L2 increases, the voltage across the detection resistor R2 also increases. If this voltage exceeds a threshold voltage that has been set in advance by the control circuit 30, the control circuit 30 switches off the switching element Q1. When the switching element Q1 is switched off, the current flows in a closed loop of the inductor L2→the diode D4→the light source unit 4, and the current flowing through the inductor L2 gradually decreases. The control circuit 30 switches on the switching element Q1 again after a certain period of time that has been set in advance from the time when the switching element Q1 is switched off.

Figure 2B:
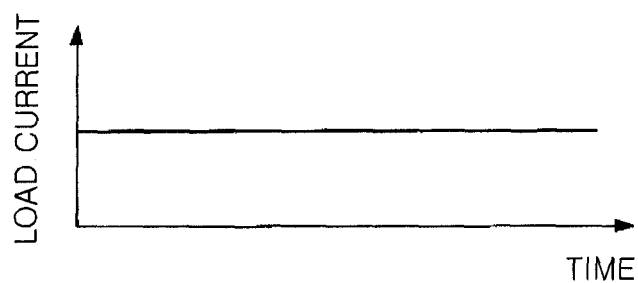

In this way, the control circuit 30 controls a timing of switching the switching element Q1 from ON to OFF in a peak-current mode, and controls a timing of switching the switching element Q1 from OFF to ON in a constant off-time mode. By repeating the above operation, the control circuit 30 controls the switching element Q1 in a continuous current mode. Accordingly, the output voltage of the power supply unit 3 is controlled to be constant, and the load current flowing through the light source unit 4 is also controlled to be constant (see FIG. 2B).

In the present embodiment as mentioned above, since a voltage equal to or higher than a constant value is outputted even in the valleys of the output voltage of the smoothing unit 2, the power supply unit 3 can always output a constant current. For this reason, it is possible to reduce the ripple component that is superimposed on the output current of the power supply unit 3, i.e., the load current.

Further, in this embodiment, since the smoothing unit 2 consists of a partial smoothing circuit, as compared to a capacitor input type smoothing circuit, a conduction angle of the input current thereof can be suppressed from being narrow, and a power factor can be improved to be equal to or larger than 0.85. Further, since it is possible to suppress a reduction in the power factor by using the partial smoothing circuit, there is no need to use a power factor correction circuit as in a conventional case, and the circuit configuration is not complicated.

Figure 3A:
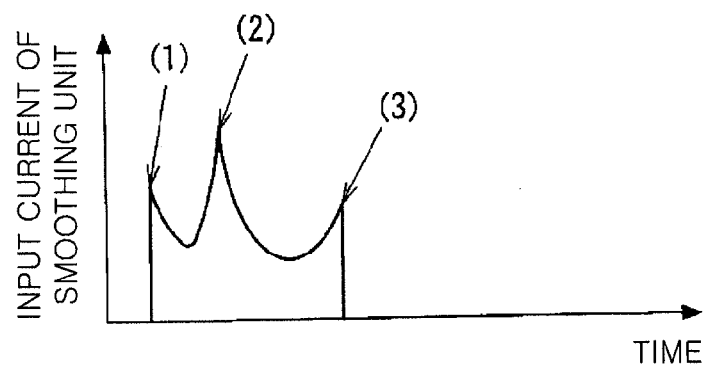
FIGS. 3A and 3B are waveform diagrams illustrating an input current of the smoothing unit in the light emitting element lighting device shown in FIG. 1A and an input current of the smoothing unit in the light emitting element lighting device shown in FIG. 1B, respectively.

Here, as shown in FIG. 3A, the input current of the smoothing unit 2 has peaks (see arrows (1) and (3) of FIG. 3A) caused by an increase of the input current in the low voltage periods of the ripple voltage outputted from the rectifying unit 1. Further, the input current of the smoothing unit 2 has a peak (see arrow (2) of FIG. 3A) due to a steep charging current flowing through each of the capacitors C3 and C4 of the partial smoothing circuit. The peak (see arrow (1) of FIG. 3A) at one end of the input current waveform occurs in a phase angle from 0 to 70 degrees. The peak (see arrow (2) of FIG. 3A) of a central portion of the input current waveform emerges in a phase angle from 60 to 90 degrees.

The inventors of the present invention have found that it is possible to reduce a peak value of the input current of the smoothing unit 2 occurring when charging each of the capacitors C3 and C4 by setting a resistance value R0 of the resistor R1 of the smoothing unit 2 and a capacitance value C0 of each of the capacitors C3 and C4 under certain conditions. Specific examples thereof will be described with reference to the drawings.

Figure 4A:
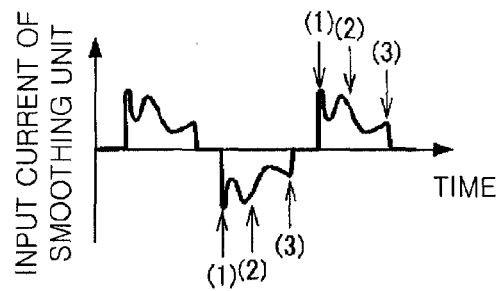
FIGS. 4A to 4F are waveform diagrams of the input current of the smoothing unit when changing a resistance value of a resistor and a capacitance value of a capacitor of the smoothing unit in the light emitting element lighting device shown in FIG. 1A.
Figure 4B:
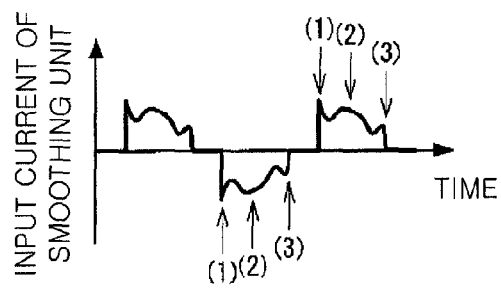
Figure 4C:
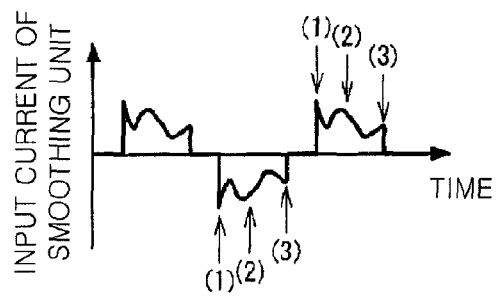
Figure 4D:
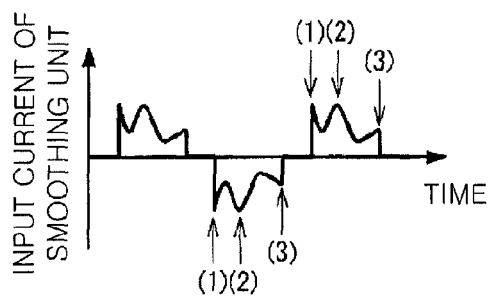
Figure 5:
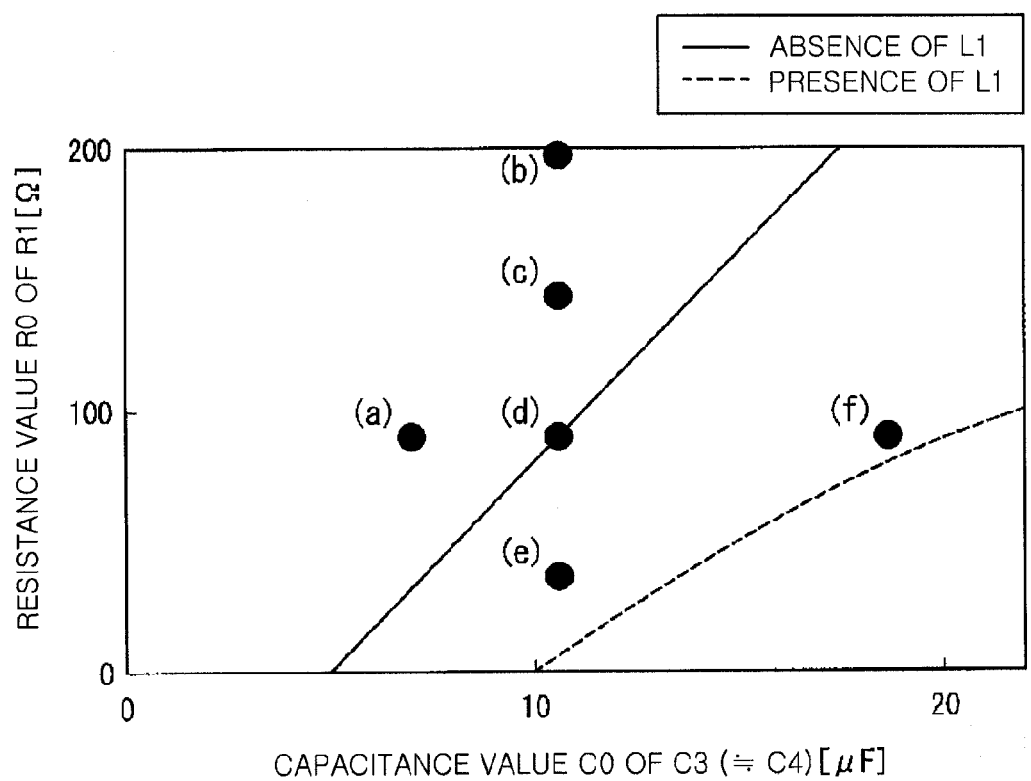
FIG. 5 is a correlation diagram of the resistance value of the resistor and the capacitance value of the capacitor of the smoothing unit.

As indicated by a point (d) in FIG. 5, when the resistance value R0 of the resistor R1 is about 100 [Ω] and the capacitance value C0 of each of the capacitors C3 and C4 is about 10 [μF], the smoothing unit 2 has an input current waveform as shown in FIG. 4D. That is, if the resistance value R0 and the capacitance value C0 are set as such, the peak values of the input current are almost the same as represented by arrows (1) and (2) of FIG. 4D.

On the basis of the set values of the point (d) of FIG. 5, if the resistance value R0 is fixed and the capacitance value C0 decreases (point (a) of FIG. 5), the peak value of the input current represented by arrow (2) is smaller than the peak value of the input current represented by arrow (1) as shown in FIG. 4A. Also, if the capacitance value C0 is fixed and the resistance value R0 increases (points (b) and (c) of FIG. 5), the peak value of the input current represented by arrow (2) is smaller than the peak value of the input current represented by arrow (1) as shown in FIGS. 4B and 4C.

Further, the larger the resistance value R0, the slower the change in the charging current of each of the capacitors C3 and C4. Thus, by lowering the peak value and reducing a steep current change in each of the capacitors C3 and C4 of the smoothing unit 2, it is possible to improve the reliability of the circuit. In this case, the peak values of the input current represented by arrows (1) and (3) do not change significantly since the power supply unit 3 supplies substantially a constant power.

Figure 4E:
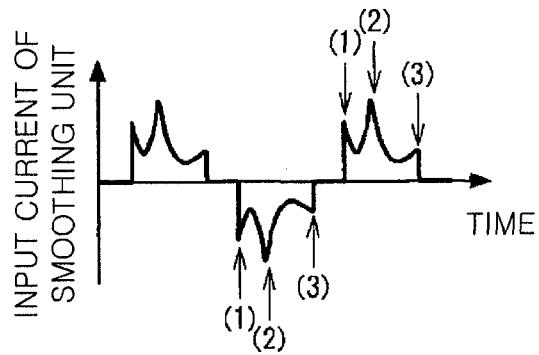
Figure 4F:
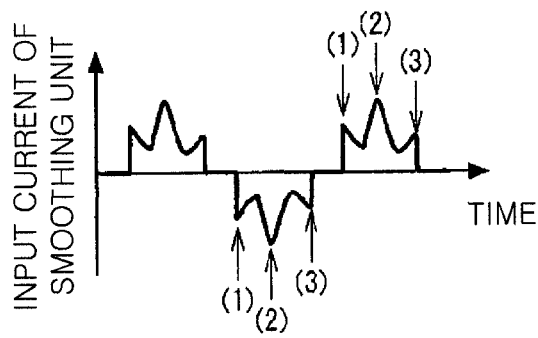

On the other hand, if the capacitance value C0 is fixed and the resistance value R0 decreases (point (e) of FIG. 5), the peak value of the input current represented by arrow (2) becomes larger than the peak value of the input current represented by arrow (1) as shown in FIG. 4E. Also, if the resistance value R0 is fixed and the capacitance value C0 increases (point (f) of FIG. 5), the peak value of the input current represented by arrow (2) becomes larger than the peak value of the input current represented by arrow (1) as shown in FIG. 4F.

As mentioned above, it was found by experiments varying the resistance value R0 and the capacitance value C0 that it is possible to effectively reduce the peak value in the vicinity of the central portion of the input current waveform of the smoothing unit 2 if it meets the conditions of $C0 \leq 5$ or $R0 \geq 16 \times C0 - 80$. That is, it is possible to effectively reduce the peak value in the vicinity of the central portion of the input current waveform of the smoothing unit 2 by setting the resistance value R0 and the capacitance value C0 to be positioned on the left region of a border line shown by the solid line in FIG. 5. For example, if the capacitance value C0 is 10 μF, the resistance value R0 may be set to be $R0 \geq 16 \times C0 - 80 = 80$ [Ω].

Therefore, for example, in case of using the present embodiment, since there is no need to use parts with a large withstanding current capability, it is possible to reduce the thickness of the wire or to reduce the capacity of the switch or breaker. In addition, by reducing the peak value in the vicinity of the central portion of the input current of the smoothing unit 2, the inclination of the input current waveform becomes gentle as a whole, thereby achieving an effect of reducing the noise or the stress on the parts constituting the circuit.

Further, since the smoothing unit 2 does not affect the ripple or power factor when the input power supplied from the power supply unit 3 is less 4 W, it may not be necessarily used. Also, if the smoothing unit 2 is used when the input power supplied from the power supply unit 3 is greater than 10 W, there are problems that a loss occurs in the diodes D1 to D3 and the resistor R1 of the smoothing unit 2, or noise increases due to a steep change in the input current thereof.

Figure 1B:
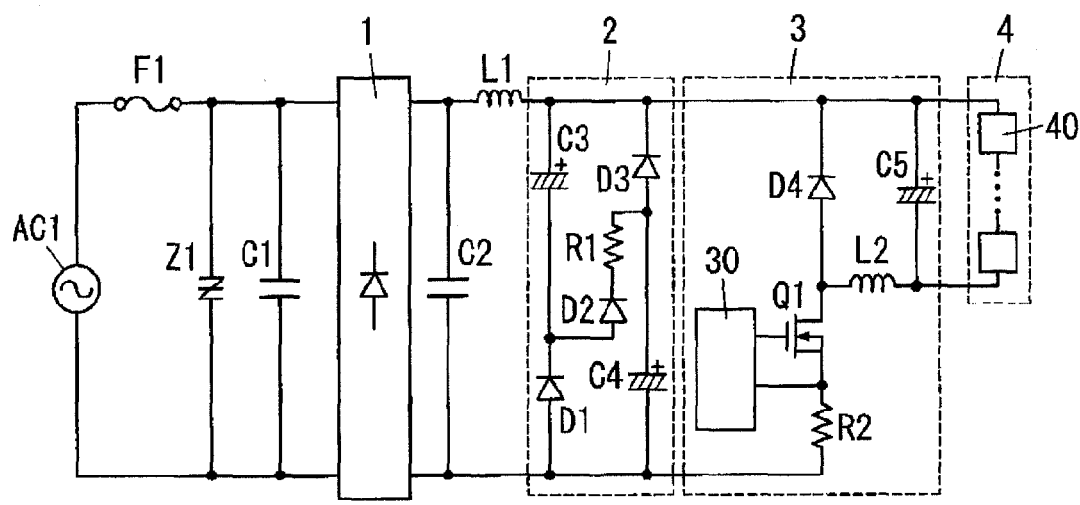

Therefore, when the input power supplied from the power supply unit 3 ranges from 4 W to 10 W, a significant effect according to this embodiment is achieved. FIG. 1B shows a light emitting element lighting device in which a normal mode choke coil is provided. In this case, the power consumption of the light source unit 4 ranges, e.g., from 5 to 25 W, and the switching frequency of the switching element Q1 is several tens to several hundreds of kHz.

As shown in FIG. 1B, a normal mode choke coil L1 (inductor element) may be inserted on a high voltage side line between the output terminal of the rectifying unit 1 and the input terminal of the smoothing unit 2. Accordingly, an LC filter including the normal mode choke coil L1 and the capacitor C2 is formed, thereby reducing the peak value of the input current of the smoothing unit 2 occurring when charging the capacitors C3 and C4.

Figure 3B:
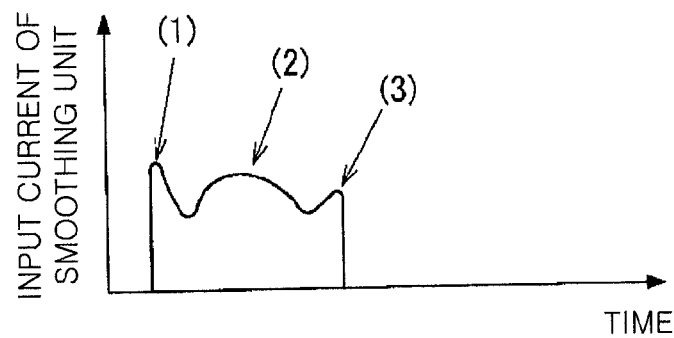

That is, by inserting the normal mode choke coil L1, it is possible to suppress a steep charging current from flowing in the capacitors C3 and C4, and reduce the peak value of the input current (see arrow (2) of FIG. 3B), as shown in FIG. 3B. Further, since the normal mode choke coil is used as the inductor element, it is possible to obtain a higher inductance value of a normal component even in the small size as compared to a case of using a common mode choke coil. Accordingly, in this embodiment, it is possible to effectively reduce the peak value of the input current of the smoothing unit 2 and reduce the noise.

Figure 4G:
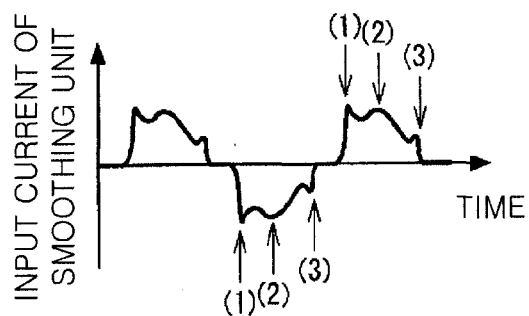
FIG. 4G is a waveform diagram of the input current of the smoothing unit when changing a resistance value of a resistor and a capacitance value of a capacitor of the smoothing unit in the light emitting element lighting device shown in FIG. 1B.

Further, in case of inserting the normal mode choke coil as described above, the border line indicated by the solid line in FIG. 5 is shifted to a position indicated by a dashed line. Accordingly, when the resistance value R0 and the capacitance value C0 have the values indicated by the point (f) of FIG. 5, the smoothing unit 2 has an input current waveform as shown in FIG. 4G.

In other words, it is possible to mitigate conditions of the resistance value R0 and the capacitance value C0 which can effectively reduce the peak value in the vicinity of the central portion of the input current waveform of the smoothing unit 2.

Further, even if the variation in the output current occurs due to, e.g., a change in the ambient environment such as a temperature, a reduction in the inductance value of the inductor L2, or input voltage fluctuations, the above effect can be more reliably achieved.

Further, since the conditions of the resistance value R0 and the capacitance value C0 are mitigated, the resistor R1 and the capacitors C3 and C4 can be more widely selected compared to a case where the normal mode choke coil L1 is not used. Furthermore, by combining the normal mode choke coil L1 with the resistor R1 of the smoothing unit 2, it is possible to more effectively achieve a gentle change in the entire input current of the smoothing unit 2 (it is possible to smooth the entire input current waveform). Thus, it is possible to obtain a high effect of reducing the noise or reducing the stress on the parts constituting the circuit.

Herein, in case of making the resistance value R0 larger than 200Ω, the loss in the resistor R1 becomes larger, and an expensive part capable of withstanding the heat should be selected as the resistor R1. Further, as the resistance value R0 increases, the peak value of the input current of the smoothing unit 2 is reduced and thereby the power factor is improved, as described above. However, when the resistance value R0 exceeds 200Ω, the power factor improvement effect becomes smaller. Further, in the input current waveform of the smoothing unit 2, the peak value of the input current represented by arrow (1) becomes excessively larger than the peak value of the input current represented by arrow (2). As a result, there is a possibility that leads to an increase in the peak value of the input current. Therefore, in this embodiment, it is preferable to set the resistance value R0 of the resistor R1 to be equal to or less than 200Ω.

Figure 6A:
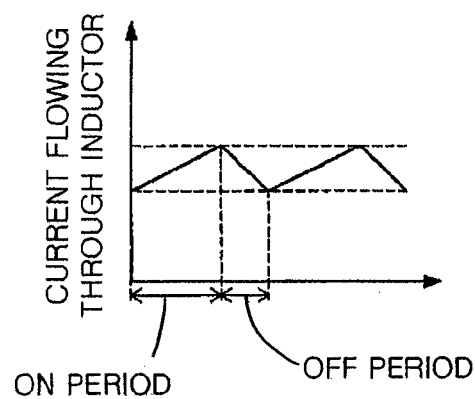
FIGS. 6A to 6C illustrate operation waveform diagrams of the light emitting element lighting device.
Figure 6B:
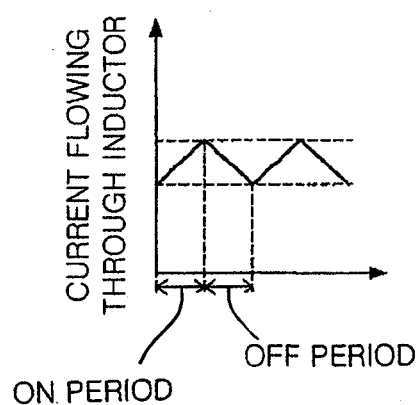
Figure 6C:
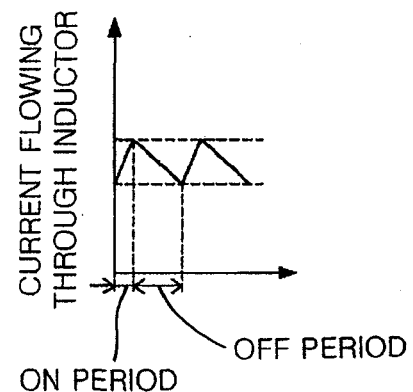

Meanwhile, an ON period of the switching element Q1 is equivalent to a period until the current flowing through the inductor L2 reaches the peak value set by the control circuit 30 after the switching element Q1 is switched on. Further, as described above, since a rising rate of the current flowing through the inductor L2 changes on the basis of the magnitude of the output voltage of the smoothing unit 2, the ON period of the switching element Q1 is changed based on the magnitude of the output voltage of the smoothing unit 2 (see FIGS. 6A to 6C).

In this embodiment, since the control circuit 30 controls the switching element Q1 in the constant off-time mode, the OFF period of the switching element Q1 is constant. Therefore, by varying the ON period of the switching element Q1, the switching frequency of the switching element Q1 can be made not to be constant. Further, the switching frequency becomes the lowest in the valleys of the output voltage of the smoothing unit 2.

In this embodiment as mentioned above, since the switching frequency can be changed by varying the ON period of the switching element Q1 based on the magnitude of the output voltage of the smoothing unit 2, it is possible to reduce the noise associated with the switching control of the switching element Q1. However, when the smoothing unit 2 is configured as a capacitor input type smoothing circuit, it is impossible to change the switching frequency because the output voltage of the smoothing unit 2 is smoothed into a constant voltage. Therefore, it is preferable that the smoothing unit 2 is configured as a partial smoothing circuit to change the output voltage as in this embodiment.

In particular, in this embodiment, the control circuit 30 controls the switching frequency of the switching element Q1 to be reduced with decrease in the output voltage of the smoothing unit 2. Accordingly, if there is a period of operating the switching element Q1 at a low frequency, it is possible to reduce the noise as a whole, and also reduce the switching loss as compared to a case of operating the switching element Q1 at a constant high frequency over one cycle. Thus, in this embodiment, the reduction of the ripple component of load current, the improvement of the power factor, and the reduction of the noise can be realized by a simple circuit configuration.

Here, a light output of the organic EL elements 40 or light emitting diodes 41 serving as light emitting elements included in the light source unit 4 is proportional to the load current flowing through the elements. For this reason, as the ripple component superimposed on the load current becomes larger, it may cause flickering in the light output. Therefore, since the light emitting element lighting device according to this embodiment is configured to reduce the ripple component in the load current, it is effective if the light emitting elements are the organic EL elements 40 or light emitting diodes 41.

However, each of the organic EL elements 40 has a high capacitive component since it serves as a surface light source. For that reason, there is a possibility that the loss may increase because the charging/discharging current increases as the ripple component increases. Therefore, the light emitting element lighting device of the present embodiment can be more effective if the light emitting elements are the organic EL elements 40.

Further, e.g., HV9910 (manufactured by Supertex) may be used as the control circuit 30, and the timing of switching the switching element Q1 from ON to OFF may be controlled by an average-current mode instead of the peak-current mode. In other words, HV9961 controls such that the switching element Q1 is switched off if an average value of the drain current of the switching element Q1 flowing through the detection resistor R2 exceeds a threshold current that has been set in advance. If it is controlled by the average-current mode, it is possible to further suppress the variation in the output current of the power supply unit 3.

Further, a drive IC such as, e.g., L6562A (manufactured by STMicroelectronics) may be used as the control circuit 30. However, since this drive IC does not have a function (constant off-time mode) of controlling the OFF period of the switching element Q1 to be constant, it is necessary to provide a separate circuit for controlling the OFF period of the switching element Q1 to be constant. For more details, it is recommended to refer to AN2928 of Application Note of STMicroelectronics (http://www.st.com/internet/com/TECHNICAL_RESOURCES/TECHNICA L_LITERATURE/APPLICATION_NOTE/CD00222928.pdf).

In the embodiment described above, although the control circuit 30 controls the switching element Q1 to vary the switching frequency thereof in order to reduce the peak value of the input current of the smoothing unit 2, it is not limited thereto, and may control the switching frequency to be constant without performing the control as such.

(Second Embodiment)

Hereinafter, a light emitting element lighting device in accordance with a second embodiment of the present invention will be described with reference to the drawings. Since a basic configuration of the second embodiment is the same as that of the first embodiment, the same reference numerals are assigned to the same components, and a description thereof will be omitted.

Figure 7A:
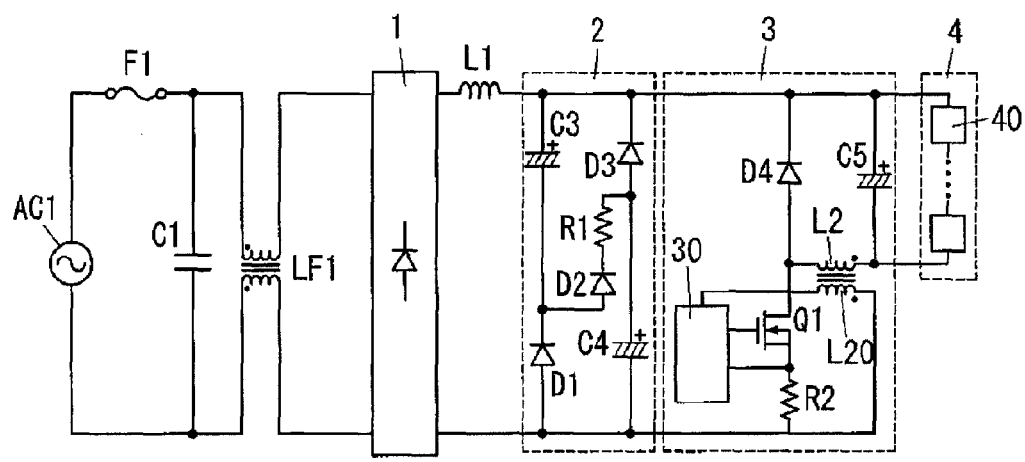
FIG. 7A shows a schematic circuit diagram of a light emitting element lighting device in accordance with a second embodiment of the present invention.
Figure 7B:
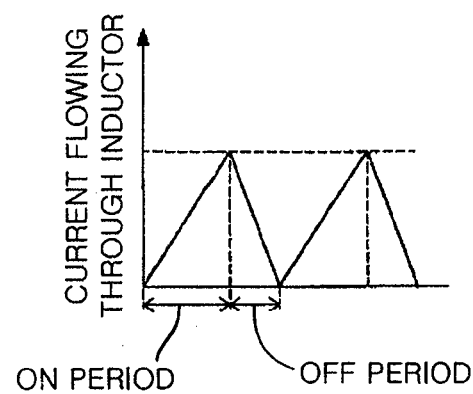
FIGS. 7B to 7D are operation waveform diagrams thereof.
Figure 7C:
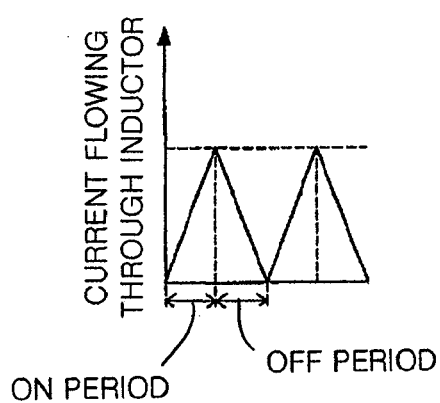
Figure 7D:
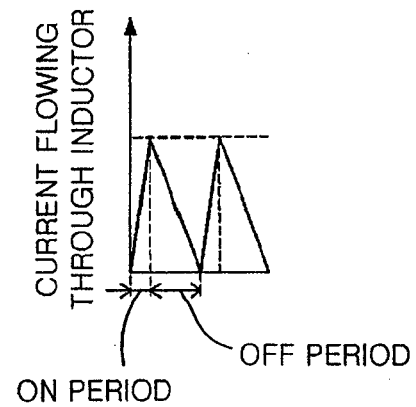

The present embodiment is characterized in that, as shown in FIG. 7A, there is provided a secondary winding L20 of the inductor L2 for detecting a current flowing through the inductor L2, i.e., the load current, and, as shown in FIGS. 7B to 7D, the control circuit 30 controls the switching element Q1 in a critical current mode. In this embodiment, provided between the commercial power source AC1 and the rectifying unit 1 is a line filter LF1 instead of the surge protection element Z1. Further, the normal mode choke coil L1 (inductance element) is inserted into a high voltage side line between the output terminal of the rectifying unit 1 and the input terminal of the smoothing unit 2.

Hereinafter, an operation of the power supply unit 3 of this embodiment will be described. First, if the switching element Q1 is switched on by the control circuit 30, the current flows in a path of the light source unit 4→the inductor L2→the switching element Q1→the detection resistor R2→the ground. At this time, a rising rate of the current flowing through the inductor L2 changes on the basis of the magnitude of the output voltage of the smoothing unit 2. That is, if the output voltage of the smoothing unit 2 is low (e.g., valleys), the rising rate of the current flowing through the inductor L2 is slower, and if the output voltage of the smoothing unit 2 is high (e.g., ridges), the rising rate of the current flowing through the inductor L2 is faster.

If the current flowing through the inductor L2 increases, the voltage across the detection resistor R2 also increases. If this voltage exceeds a threshold voltage that has been set in advance by the control circuit 30, the control circuit 30 switches off the switching element Q1. If the switching element Q1 is switched off, the current flows in a closed loop of the inductor L2→the diode D4→the light source unit 4, and the current flowing through the inductor L2 gradually decreases. The control circuit 30 detects the current flowing through the inductor L2 by the voltage induced in the secondary winding L20 of the inductor L2, and switches on the switching element Q1 again when it detects that the current falls to zero.

In this way, the control circuit 30 controls a timing of switching the switching element Q1 from ON to OFF in a peak-current mode, and controls a timing of switching the switching element Q1 from OFF to ON by detecting the zero-crossing of the current flowing through the inductor L2. By repeating the above operation, the control circuit 30 controls the switching element Q1 in the critical current mode. Accordingly, the output voltage of the power supply unit 3 is controlled to be constant, and the load current flowing through the light source unit 4 is also controlled to be constant.

Here, the ON period of the switching element Q1 is equivalent to a period until the current flowing through the inductor L2 reaches the peak value set by the control circuit 30 after the switching element Q1 is switched on. Further, since the rising rate of the current flowing through the inductor L2 changes based on the magnitude of the output voltage of the smoothing unit 2 as described above, the ON period of the switching element Q1 is changed based on the magnitude of the output voltage of the smoothing unit 2 (see FIGS. 7B to 7D). Therefore, by varying the ON period of the switching element Q1, the switching frequency of the switching element Q1 can be changed. Further, the switching frequency becomes the lowest in the valleys of the output voltage of the smoothing unit 2.

As in the first embodiment, since the switching frequency is changed by varying the ON period of the switching element Q1 based on the magnitude of the output voltage of the smoothing unit 2, it is possible to reduce the noise occurring in the switching control of the switching element Q1. Further, in this embodiment, since the control circuit 30 controls the switching element Q1 in the critical current mode, it is possible to more effectively reduce the noise and also increase the efficiency.

Further, as the control circuit 30, for example, L6562A (manufactured by STMicroelectronics) may be used, or SSL2108x (manufactured by NXP Semiconductors) may be used. Also, instead of the peak-current mode, in the same manner as in the first embodiment, the timing of switching the switching element Q1 from ON to OFF may be controlled by the average-current mode. If it is controlled by the average-current mode, it is possible to further suppress variations in the output current of the power supply unit 3.

Further, in this embodiment, the current flowing through the inductor L2 is detected by the secondary winding L20 of the inductor L2 and, if the current is less than the threshold current that has been set in advance, the control circuit 30 may control the switching element Q1 to be switched on. In this case, the control circuit 30 controls the switching element Q1 in the continuous current mode rather than the critical current mode. Further, although the current flowing through the inductor L2 is detected by the secondary winding L20 of the inductor L2 in this embodiment, the current flowing through the inductor L2 may be detected by another means. Although the inductance element L1 is illustrated in FIG. 7A of this embodiment, but the inductance element L1 may be omitted.

(Third Embodiment)

Hereinafter, a light emitting element lighting device in accordance with a third embodiment of the present invention will be described with reference to the drawings. However, since a basic configuration of the third embodiment is the same as that of the first embodiment, the same reference numerals are assigned to the same components, and a description thereof will be omitted.

Figure 8:
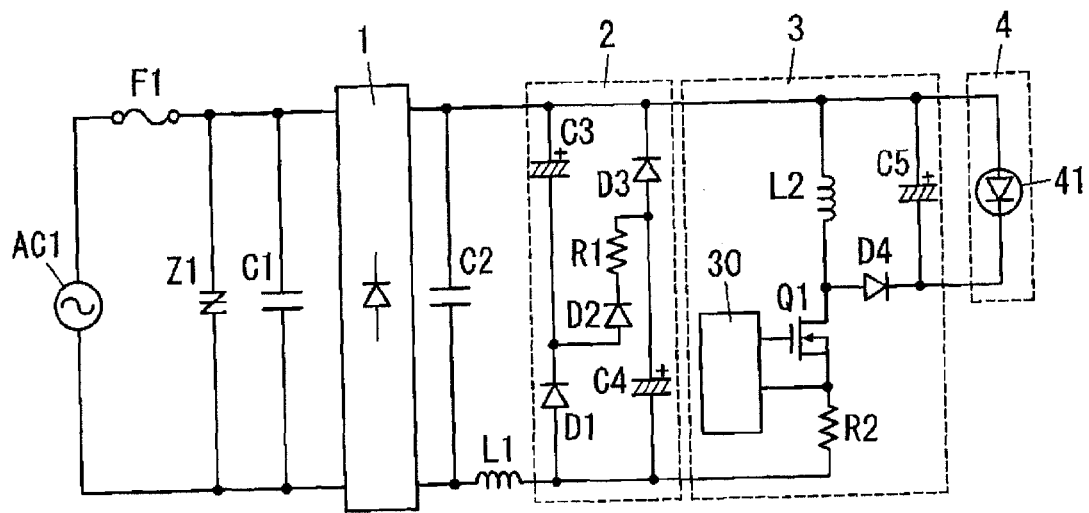
FIG. 8 illustrates a schematic circuit diagram showing a light emitting element lighting device in accordance with a third embodiment of the present invention.

This embodiment is characterized in that, as shown in FIG. 8, the power supply unit 3 is configured as a step-up/step-down chopper circuit. In this embodiment, the light emitting diodes 41 are used as the light emitting elements of the light source unit 4. In addition, in this embodiment, the output voltage of the power supply unit 3 is about 60 to 80V.

In general, if the light source unit 4 has the same power consumption, the circuit efficiency increases as the load voltage applied to the light source unit 4 is higher. Therefore, it is possible to improve the efficiency of the circuit by increasing the output voltage of the power supply unit 3 to increase the load voltage of the light source unit 4. However, if the power supply unit 3 is configured as a step-down chopper circuit as in the first and second embodiments, it is necessary to control the output voltage of the power supply unit 3 to be lower than a minimum value of the output voltage of the smoothing unit 2. If there is a period in which the output voltage of the power supply unit 3 is higher than the output voltage of the smoothing unit 2, the output voltage of the power supply unit 3 has valleys and the load current also has valleys because the output voltage of the smoothing unit 2 is not stepped up in this period.

However, in this embodiment, since the power supply unit 3 is configured as a step-up/step-down chopper circuit, even if there is a period in which the output voltage of the power supply unit 3 is higher than the output voltage of the smoothing unit 2, the output voltage of the smoothing unit 2 is stepped up in this period. For this reason, there is no possibility that the load current may have valleys as in a case where the power supply unit 3 is configured as a step-down chopper circuit. As a result, it is possible to perform stable constant current control.

In this embodiment as described above, it is possible to increase the output voltage of the power supply unit 3 regardless of the low voltage period of the output voltage of the smoothing unit 2, thereby further improving the circuit efficiency. In particular, this embodiment is effective if the power consumption of the light source unit 4 is high to some extent (e.g., more than 5 W).

In this embodiment, the normal mode choke coil L1 is inserted into a ground side line between the output terminal of the rectifying unit 1 and the input terminal of the smoothing unit 2. In this manner, it is possible to more effectively reduce the noise by inserting the normal mode choke coil L1 into a line on the same side as the switching element Q1.

(Fourth Embodiment)

Hereinafter, a light emitting element lighting device in accordance with a fourth embodiment of the present invention will be described with reference to the drawings. However, since a basic configuration of the present embodiment is the same as that of the second embodiment, the same reference numerals are assigned to the same components, and a description thereof will be omitted.

Figure 9:
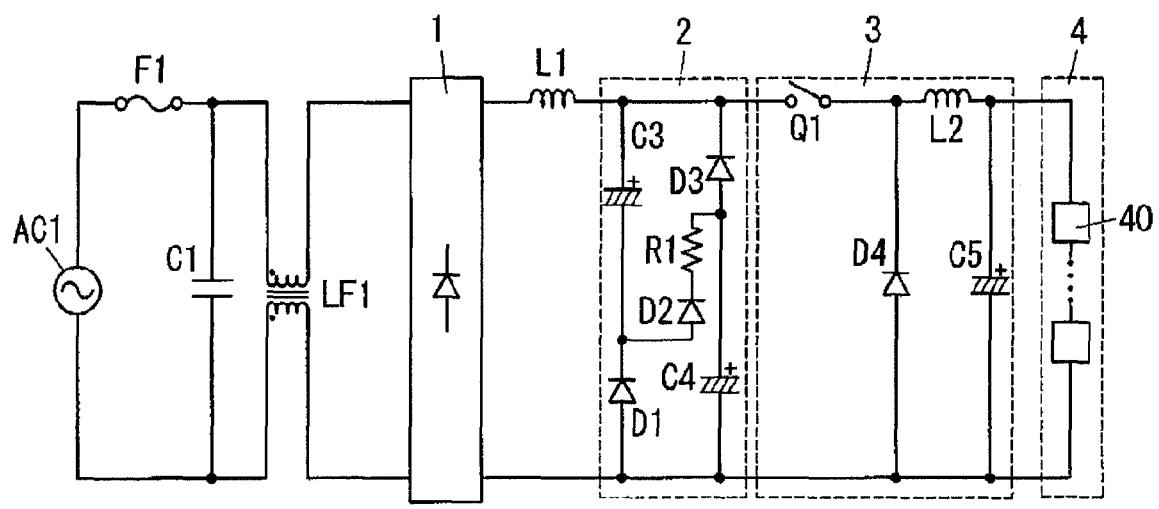
FIG. 9 depicts a schematic circuit diagram showing a light emitting element lighting device in accordance with a fourth embodiment of the present invention.

This embodiment is characterized in that, as shown in FIG. 9, although the basic configuration is the same as that of the second embodiment, the capacitance of each of the capacitors C3 and C4 of the smoothing unit 2 is reduced such that the output voltage of the smoothing unit 2 decreases with the passage of time in the valleys of the output voltage of the smoothing unit 2. Further, the detection resistor R2 and the control circuit 30 are omitted and the switching element Q1 is simplified in FIG. 9.

The control circuit 30 of this embodiment, in the same manner as in the first embodiment, controls a timing of switching the switching element Q1 from ON to OFF in the peak-current mode, and controls a timing of switching the switching element Q1 from OFF to ON in the constant off-time mode. By repeating the above operation, the control circuit 30 controls the switching element Q1 in a continuous current mode. However, in this embodiment, by setting the OFF period of the switching element Q1 to be longer than that of the first embodiment, the control circuit 30 controls the switching element Q1 in a discontinuous current mode (see FIGS. 10B and 10C).

Each of the capacitors C3 and C4 of the smoothing unit 2 is charged in a period other than the low voltage period of the ripple voltage outputted from the rectifying unit 1, and discharged in the low voltage period. In this embodiment, the capacitance of each of the capacitors C3 and C4 of the smoothing unit 2 is reduced to discharge each of the capacitors C3 and C4 in the valleys of the output voltage of the smoothing unit 2. Accordingly, the output voltage of the smoothing unit 2 gradually decreases with a certain slope (see FIG. 10A). Therefore, in this embodiment, by changing the output voltage even in the valleys of the output voltage of the smoothing unit 2, the ON period of the switching element Q1 is varied, and the switching frequency also can be change compared with the first to third embodiments. For this reason, in this embodiment, it is possible to more effectively reduce the noise.

In this embodiment, as shown in FIG. 9, the switching element Q1 is installed on the high voltage side line. Thus, since the ground side line is stable, it is possible to reduce the noise. In addition, in this embodiment, the normal mode choke coil L1 is inserted into the high voltage side line between the output terminal of the rectifying unit 1 and the input terminal of the smoothing unit 2. In this manner, it is possible to more effectively reduce the noise by inserting the normal mode choke coil L1 into a line on the same side as the switching element Q1. In this embodiment, the capacitor C2 is not connected to the output terminal of the rectifying unit 1, and an LC filter is formed by combination of the normal mode choke coil L1 and the capacitors C3 and C4 of the smoothing unit 2.

Figure 10A:
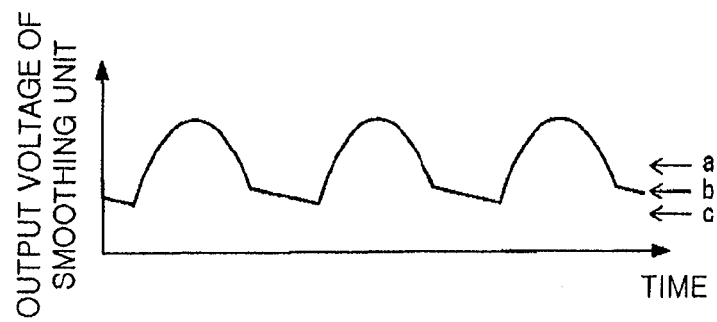
FIGS. 10A to 10C show operation waveform diagrams of the light emitting element lighting device in accordance with the fourth embodiment.
Figure 10B:
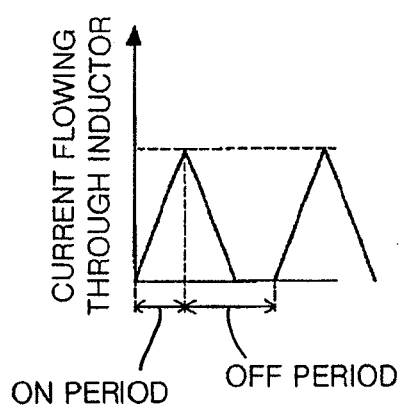
Figure 10C:
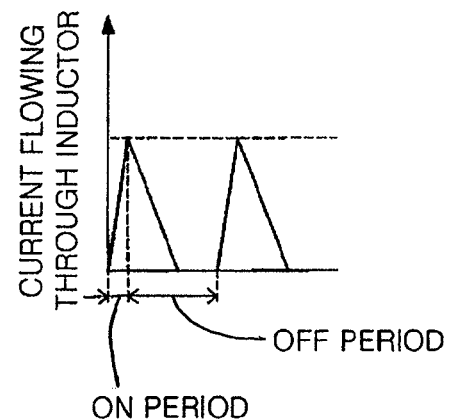

Although the power supply unit 3 is configured as a step-down chopper circuit in this embodiment, it may be configured as a step-up/step-down chopper circuit in the same manner as in the third embodiment. In this case, if it is controlled such that the output voltage of the power supply unit 3 as shown in FIG. 10A is higher than a minimum value (see arrow c of FIG. 10A) of the output voltage of the smoothing unit 2, stable constant current control can be performed.

Moreover, if it is controlled such that the output voltage of the power supply unit 3 is higher than a voltage value (see arrow b of FIG. 10A) of the valleys of the output voltage of the smoothing unit 2, it is possible to significantly reduce the ripple component of the output current. Further, if it is controlled such that the output voltage of the power supply unit 3 becomes a voltage value (see arrow a of FIG. 10A) greater than that of the valleys of the output voltage of the smoothing unit 2, it is possible to improve the circuit efficiency.

Hereinafter, an illumination apparatus in accordance with an embodiment of the present invention will be described with reference to the drawings. First, a description will be given of an embodiment of the illumination apparatus using the organic EL elements 40 as the light emitting elements of the light source unit 4. Further, a light emitting element lighting device A1 of this embodiment is configured using the lighting device of any of the above-described embodiments.

Figure 11A:
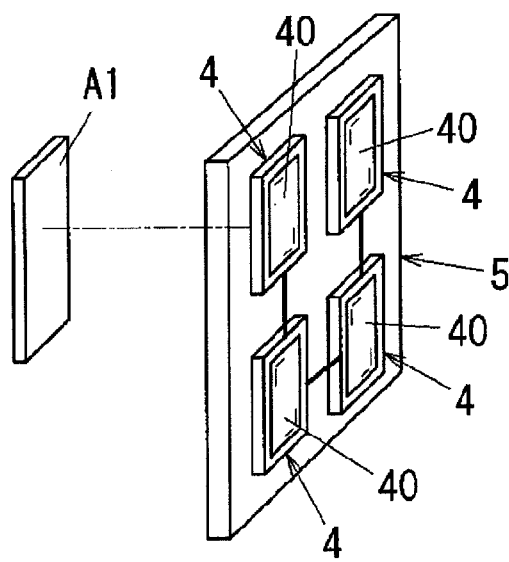
FIGS. 11A and 11B are schematic diagrams illustrating examples of an illumination apparatus of the present invention.

The illumination apparatus of this embodiment includes, as shown in FIG. 11A, a plurality of (four in the illustrated example) light source units 4 serving as panel type illumination modules using the organic EL elements 40 as light emitting elements and a panel type apparatus body 5 on which the light source units 4 are mounted. Then, by electrically connecting the light emitting element lighting device A1 that is provided separately from the apparatus body 5 to each of the light source units 4 via cables and the like (not shown), lighting power is supplied from the light emitting element lighting device A1 to each of the light source units 4.

In this embodiment, since the light emitting element lighting device A1 of any of the above embodiments is used, it is possible to obtain the same effect as that of the above embodiments. In addition, in this embodiment, since the organic EL elements 40 each serving as a surface light source are used as light emitting elements, it is possible to realize a thin illumination apparatus, and for example, it may be suitably used in indoor illumination.

Figure 11B:
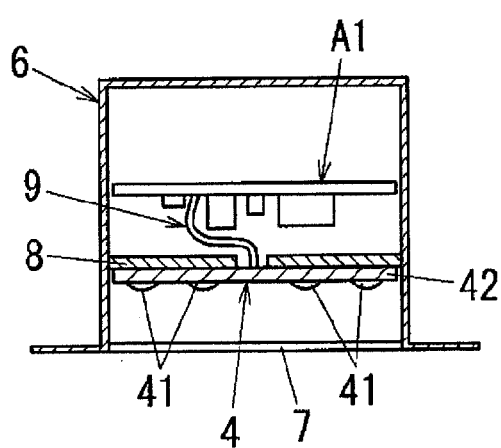

Next, a description will be given of an embodiment of the illumination apparatus using the light emitting diodes 41 as the light emitting elements of the light source unit 4. In the following description, a direction extending up and down in FIG. 11B is referred to as a vertical direction. Further, the light emitting element lighting device A1 of this embodiment is configured using the lighting device of any of the above-described embodiments.

The illumination apparatus of this embodiment includes, as shown in FIG. 11B, the light source unit 4 using the light emitting diodes 41 as light emitting elements, and an apparatus body 6 accommodating the light source unit 4, and the apparatus body 6 is embedded in the ceiling. The apparatus body 6 is made of, e.g., metal such as aluminum die casting, and is formed in a cylindrical shape having an open lower end portion.

Arranged on the inside of the apparatus body 6 is the light source unit 4 including a plurality of (four in the illustrated example) light emitting diodes 41 and a substrate 42 on which a series circuit of the light emitting diodes 41 is mounted.

Further, each of the light emitting diodes 41 is arranged such that light is irradiated in a downward direction. Accordingly, the light is irradiated to an external space from the lower end portion of the apparatus body 6. In addition, the opening of the lower end portion of the apparatus body 6 is provided with a light diffusion plate 7 for diffusing the light from each of the light emitting diodes 41.

A heat radiation plate 8 is disposed on the upper surface of the substrate 42 such that the heat generated from the light emitting diodes 41 is emitted to the apparatus body 6 through the heat radiation plate 8. Further, the light emitting element lighting device A1 is disposed above the light source unit 4 in the apparatus body 6, and is connected to the light source unit 4 via a lead line 9.

With this embodiment described above, since the light emitting element lighting device A1 of any of the above embodiments is used, it is possible to obtain the same effect as that of the above embodiments.

While the invention has been shown and described with respect to the embodiments, it will be understood by those skilled in the art that various changes and modification may be made without departing from the scope of the invention as defined in the following claims.

What is claimed is:

1. A lighting device for turning on light emitting elements, comprising:
    a rectifying unit which rectifies an AC voltage outputted from a power supply;
    a smoothing unit which smoothes a ripple voltage outputted from the rectifying unit;
    a power supply unit which has a switching element and converts an output voltage of the smoothing unit into a predetermined DC voltage by switching on/off of the switching element to output the predetermined DC voltage; and
    a control unit which controls on/off of the switching element,
    wherein the smoothing unit includes two capacitors which are connected in series when charged and are connected in parallel when discharged and a resistor inserted into a charging path, the smoothing unit serving as a partial smoothing circuit for partially smoothing a low voltage period of the ripple voltage outputted from the rectifying unit,
    wherein the power supply unit supplies a lighting power to a light source unit including one or more light emitting elements,
    wherein an input current of the smoothing unit has at least two peak values, and
    wherein at least one of a resistance value of the resistor and a capacitance value of each of the capacitors is set such that the peak value of the input current occurring when charging the capacitors of the smoothing unit is smaller than at least one of the other peak values of the input current.

2. The lighting device of claim 1, wherein an input power supplied to the power supply unit is 4 W-10 W and the resistance value $R0$ [Ω] of the resistor and the capacitance value $C0$ [μF] of each of the capacitors are set to meet $C0 \leq 5$ or $R0 \geq 16 \times C0 - 80$.

3. The lighting device of claim 1, wherein the resistance value $R0$ of the resistor is set to be equal to or less than 200Ω.

4. The lighting device of claim 1, wherein an inductance element is provided on a high voltage side line or a low voltage side line between the rectifying unit and the smoothing unit.

5. The lighting device of claim 1, wherein the control unit controls a switching frequency of the switching element to decrease as the output voltage of the smoothing unit decreases.

6. An illumination apparatus comprising:
    the light emitting element lighting device described in claim 1; and
    an apparatus body accommodating the light emitting element lighting device.

* * * * *